United States Patent [19]

Medina

[11] Patent Number: 4,654,699

[45] Date of Patent: Mar. 31, 1987

[54] THREE DIMENSIONAL VIDEO IMAGE DISPLAY SYSTEM

[76] Inventor: Antonio Medina, One Emerson Pl., Apt. 17J, Boston, Mass. 02114

[21] Appl. No.: 761,085

[22] Filed: Jul. 31, 1985

[51] Int. Cl.$^4$ ............................................... H04N 13/00
[52] U.S. Cl. .......................................... 358/88; 358/92
[58] Field of Search .................. 358/88, 92, 3; 378/99

[56] References Cited

U.S. PATENT DOCUMENTS

| 1,725,710 | 8/1929 | Hammond | 358/3 |
| 3,076,054 | 1/1963 | Simon | 378/99 |
| 3,585,382 | 6/1971 | Suganuma | 358/92 |
| 3,705,261 | 12/1972 | Langley | 358/88 |
| 4,510,525 | 4/1985 | Kuperman | 358/88 |

Primary Examiner—Howard W. Britton
Attorney, Agent, or Firm—Wolf, Greenfield & Sacks

[57] ABSTRACT

A system for displaying three dimensional images in conventional standard stereo pairs in which the displayed image may be conventionally viewed as a three dimensional object by appropriately channelling the individual ones of the stereo pairs each to a different eye of the viewer. The stereo pairs are generated without the use of two cameras, but rather with use of an energy detector such as a single photomultiplier tube or other photosensor devices and with a pair of spaced energy sources such as light beams that scan the object. Thin beams of light such as laser beams may be used as energy sources.

9 Claims, 4 Drawing Figures

THREE DIMENSIONAL VIDEO IMAGE DISPLAY SYSTEM

SUBJECT MATTER OF INVENTION

The present invention relates to a means for displaying three dimensional images in a system which utilizes a pair of energy sources and single energy detector.

BACKGROUND OF THE INVENTION

Heretofor, two dimensional video images of an object or a scene have been effected without using a camera. In such a system, the object is illuminated by scanning light, such as a laser beam, which moves over the scene in a raster similar to the movement of an electron gun in a CRT. The light from the laser beam reflected by the scene is picked up by a photomultiplier which controls the beam intensity of a cathode ray tube of a video monitor. Thus, as the laser beam scans the object the photomultiplier senses variations in the reflected light and generates an analog output which is coupled to the gun of the cathode ray tube of the video monitor. The movement of the electron beam emanating from the gun of the cathode ray tube is synchronized with the movement of the laser beam. Such systems are useful for generating two dimensional images on a monitor and have been used in the inspection of nuclear reactors and in scanning laser opthalmoscopes. However, to date such systems have not been useful or adaptable for three dimensional displays.

In addition to such systems numerous efforts have been made to create a wide range of three dimensional imaging systems. Some of these systems have been described in a number of issued U.S. patent including U.S. Pat. Nos. 1,372,645; 1,595,295; 2,235,743; 2,360,322; 2,568,327; 2,751,826; 3,039,358; 3,731,606; 3,810,213; 3,990,087; 4,009,951; 4,189,210; 4,290,675; and 3,431,299.

OBJECTS AND SUMMARY OF INVENTION

It is an object of the present invention to provide a novel system for generating three dimensional images as standard stereo pairs which may utilize an energy source selected from a wide frequency spectrum. Thus, the present invention is designed to generate three dimensional images utilizing visible light waves or other wave lengths such as infrared or ultraviolet, with a suitable detector. Additionally, the present invention is designed for use with other types of radiation sources different from electromagnetic waves such as X-rays or ultrasound.

A further object of the present invention is to provide a means for generating standard stereo pairs of images of an object, making use of an energy sensitive means, which generates a pair of signals which may be appropriately channelled for stereoscopic viewing.

A further object of the present invention is to provide an improved means for generating three dimensional images without the use of a pair of cameras and by means which may be adaptable for use in a variety of systems and for a variety of purposes.

A still further object of this invention is to provide an improved means and method that may be adopted for generating three dimensional images in video broadcasting or recording, video monitoring, and surveilance and reconnaissance systems.

The present invention provides an improved means for generating standard stereo pairs of images which may be detected and transmitted either in analog or digital form.

In the present invention there is provided a three dimensional display system comprising a means for independent raster scanning of an object with a pair of beams of energy, preferably in the visible light spectrum. The independent energy sources are synchronized, one with the other, and with a raster signal in a display means. The energy from the sources is reflected from the scanned object and detected by a suitable photosensitive device, such as a photomultiplier tube. The photosensitive device generates the input to a display means, which, in a preferred embodiment, may comprise a CRT tube. Suitable means are provided for segregating the input signals from the two different energy sources so that the viewer may stereopically distinguish the two signals.

BRIEF DESCRIPTION OF THE DRAWINGS

The foregoing objects and advantages of the present invention will be more clearly understood when considered in conjunction with the accompanying drawings which.

DETAILED DESCRIPTION OF THE INVENTION

Figure 1:
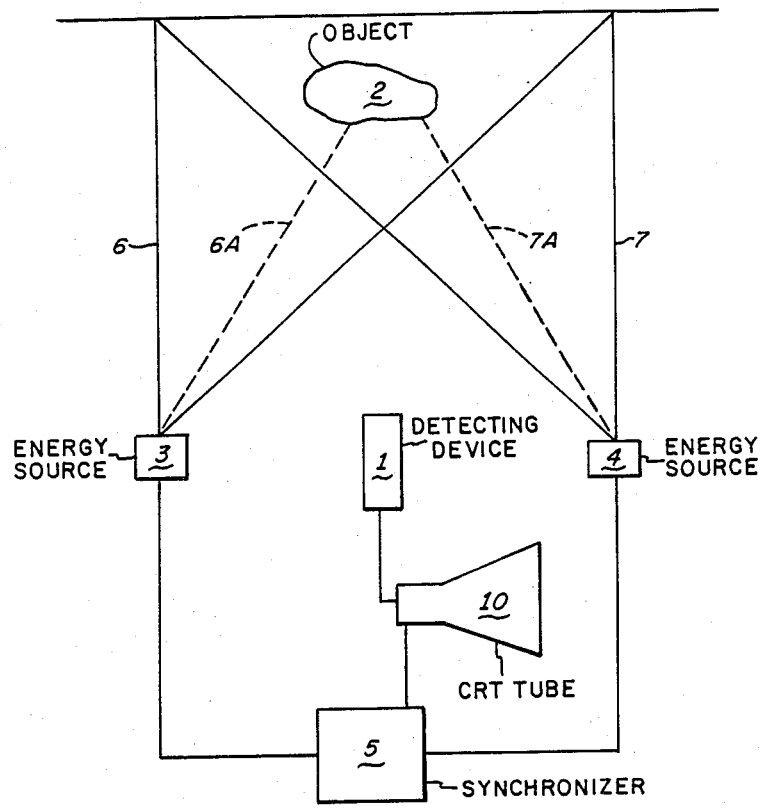
FIG. 1 illustrates a schematic arrangement of the present invention in a preferred form.

FIG. 1 illustrates a schematic embodiment of the present invention in which a detecting device 1 such as a photomultiplier detects energy reflected from object 2. The beams of energy are generated by suitable and known means from spaced energy sources 3 and 4. These sources 3 and 4 may and preferable comprise means for generating a narrow beam of energy, preferable within the visual light frequency spectrum. Sources 3 and 4, such for example as laser beams, are independently driven, one from the other, by suitable means for raster scanning of the object 2. The scanning function of the sources 3 and 4 are controlled by a synchronizer 5. The detector device, is arranged to separately detect reflections from the object 2 of beams 6 and 7. Thus, for example, during a raster scan, either during the duration of a line or a frame of beam 6, generated by source 3, source 4 will be turned off. Conversely when beam 7 is generated from source 4, source 3 is inoperative. Thus, the signals detected by the detector device or photomultiplier 1 in the form of reflected signal from beams 6 and 7 may be distinguish one from the other.

Because the energy beams 6 and 7 scan the same area of the object 2 from spaced apart locations, the scanning beams 6, 7 reach the same point in the object 2 in any horizontal scan at a different time. It is also clear that if the outer full lines at 6 and 7 respectively indicate the range of the scan respectively of the sources 3 and 4, that dotted lines 6A and 7A, respectively, identify in FIG. 1 the half time period for a horizontal scan of each of the beams from sources 3 and 4, and that these scans accordingly impinge upon different portions of the object 2 at any given time.

The reflected energy detected by the photomultiplier 1 is fed to a display means such as a CRT tube 10 that operates in a conventional fashion, but with the raster in synchrony with the scanning energy beams.

Figure 2A:
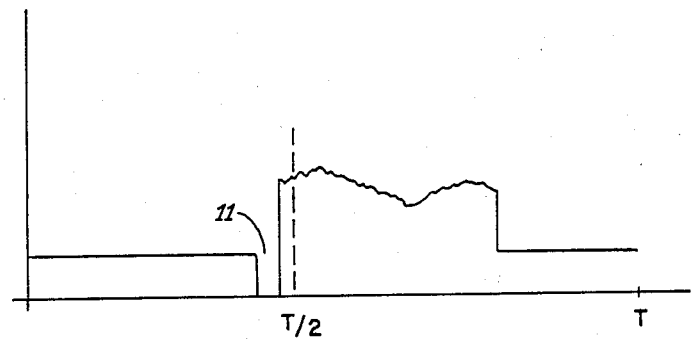
FIGS. 2A and 2B are representations of the output signal of two energy sources generated by an embodiment of the invention.
Figure 2B:
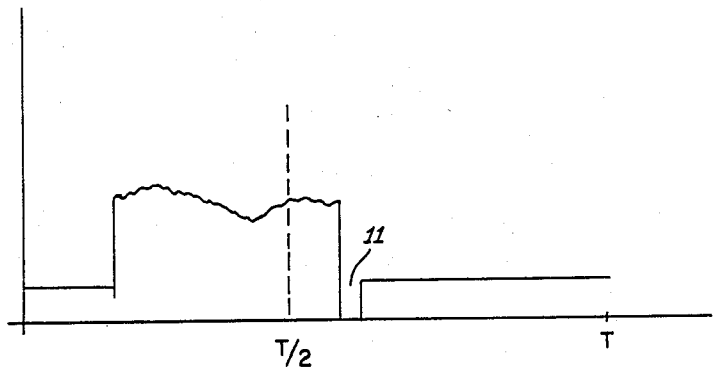

Referring now to FIGS. 2A and 2B there is illustrated an output signal of the photomultiplier tube for a single line scan of energy reflected from the beam 6 and 7 respectively. In this schematic T is the time required for the scanning beam as well as the electron gun in CRT 10 in FIG. 1 to scan the screen from one side to the other T/2 is one half of that time. The video output at time T/2 corresponds to the light reflected from beam 6A and 7A in FIG. 1 when beam 6 and 7 respectively are scanning. From inspection it is apparent that the images generated by the beams are shifted from each other in the same fashion as if they were the images on observers eyes located at 3 and 4 respectively. This is so because the image obtained from a photomultiplier when so used in a synchronous system is a mere projection of the scene with the center of the projection being at the location of the energy source which is independent of the position of the photomultiplier.

The image generated in the CRT 10 comprises, in substance, two separate images which must be segregated for human viewing as separate images. The output signal resulting from reflection from source 3 can be segregated from those originating from source 4 as illustrated in FIG. 2 on a time basis. Several other methods are available for segregating or channelling the separate images to the eyes.

Figure 3:
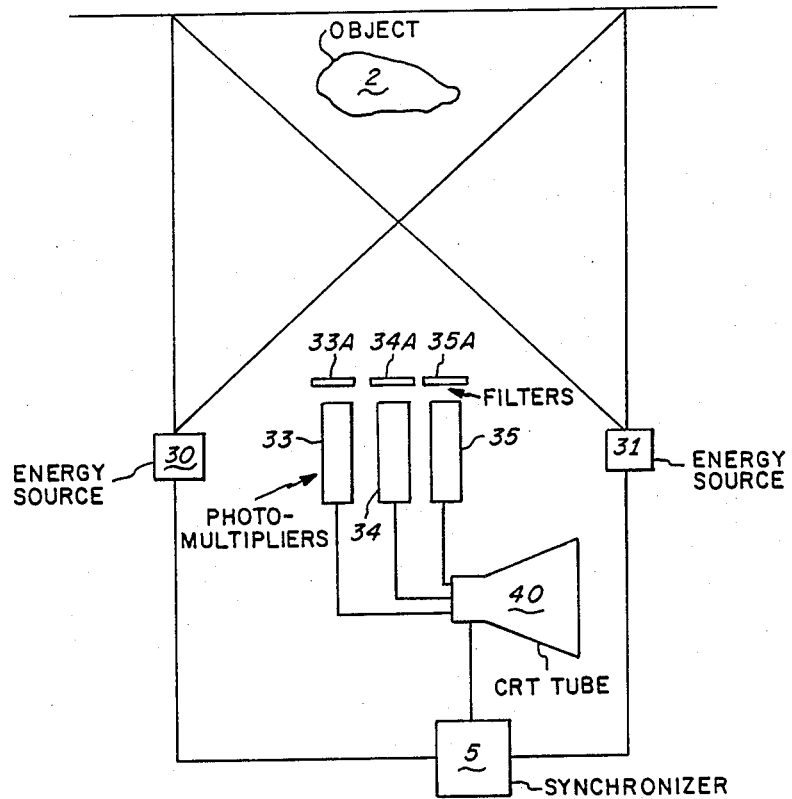
FIG. 3 is a schematic of the components comprising an alternative form of the present invention for full color rendition.

Separate spectral bands may be used for each of the sources 3 and 4. In this case full color reproduction can be achieved if spectral bands are complimentary and three photomultipliers are used with a filter in front of each. The filter transmission characteristics are matched to the sensitivity of the three phosphors of the color CRT tube. Such an arrangement is best illustrated in FIG. 3. In this arrangement, an object 2 is scanned in a manner as previously described except that energy sources 30 and 31 are visible light sources in the red and cyan frequency range. Reflections from the object 2 are selectively detected by the photomultipliers 33, 34 and 35. A red filter 33A is positioned in front of photomultiplier 33, green filter 34A is positioned in front of photomultiplier 34 and blue filter 35A is positioned in front of photomultiplier 35. The detected reflections may thus be separately identified and fed to CRT 40 and displayed for stereoscopic viewing with appropriate filter glasses, such as cyan for right eye and red for left eye in the case depicted in FIG. 3.

Alternatively, a system illustrated in FIG. 1 may be used, in which the scan from sources 3 and 4 are alternated. Thus, while the reflected signal from source 3 is on, the source 4 is off, and vice versa. The on-off time period could be either a line, a frame, a field or a fraction of a field depending on the scanning frequency. The alternations from one to the other however, must be fast enough for the image to persist on the eye (the beta frequency). The two images may then be presented sequentially on the screen of a cathode ray tube 10 and viewed by an individual with goggles that have electronic shutters operating in synchrony with the ON-OFF sequence of the scan from the sources 3 and 4.

The position of the energy detector of the photomultiplier 1 does not affect the generation of the stereo pair images except from shadows. Shadows will be obviously cast and these shadows will be identical to those seen by an observer viewing the scene with his eyes in the location of energy sources 3 and 4 and with a single light source located in the locus of the detector 1. As noted in FIG. 2 the shadows, illustrated at 11, are defined by notches. These shadows naturally enhance the three dimensional aspects of the signal being generated.

Although the preferred embodiment of this invention is described in connection with electromagnetic energy in the visible frequency spectrum other wave lengths, such as infrared or ultraviolet may work equally well with a suitable detector. Additionally, other types of energy radiation such as X-rays or ultrasound are also capable of being adapted for use in connection with the invention herein disclosed.

I claim:

1. A three dimensional display system comprising a pair of spaced means for independent raster scanning of an object with a beam of energy, detector means for independently receiving reflected signals from each of said spaced scanning means, means for synchronizing the movement of beams of energy from said independent raster scanning means, means for generating output images from said receiving means in which said output images are generated from said independent signals and form a pair of stereopically related images.

2. A three dimensional display system as set forth in claim 1, wherein means are provided to generate said pair of stereoscopically related images on a cathode ray tube whose electron beam raster is synchronized with said raster scanning of the object with independent beams of energy.

3. A three dimensional display system as set forth in claim 2, wherein means are provided for visually segregating for separate viewing, one by each eye, of said pair of steropically related images.

4. A three dimensional display as set forth in claim 2 wherein said spaced means include means for generating a beam in the visible light frequency of the energy spectrum and said detector means comprises a photomultiplier tube.

5. A three-dimensional display system comprising a pair of means for generating beams of energy, means for raster scanning of an object with each of said beams, means for detecting said beams of energy reflected from said object with the reflected beam from one generating means segregated from the reflected beam from the other generating means, means for generating output image from said detecting means in which the output images are generated from said reflected energy and form a pair of stereopically related images.

6. A system as set forth in claim 5 wherein said means for detecting said beams of energy include means for segregating said reflected beams one from the other on a time basis.

7. A system as set forth in claim 6 wherein said pair of means for generating energy includes a pair of means for generating a pair of beams in the visual light frequency spectrum, and said means for segregating includes means for selectively actuating one or the other of said pair of energy generating means.

8. A system as set forth in claim 5 wherein said means for detecting said beams of energy include means for segregating said reflected beams, one from the other on an energy level basis.

9. A system as set forth in claim 8 wherein said different energy levels are in the visible light frequency range and said means for detecting and segregating said beams include a plurality of visible light detectors and a plurality of different light filters.

* * * * *